United States Patent
Kang et al.

(10) Patent No.: US 12,544,457 B2
(45) Date of Patent: Feb. 10, 2026

(54) SELF-ASSEMBLED COMPLEX CONTAINING COPPER IONS

(71) Applicant: Korea University Research and Business Foundation, Seoul (KR)

(72) Inventors: Heemin Kang, Seoul (KR); Sung-Gue Lee, Siheung-si (KR); Na-Yeon Kang, Seoul (KR); Yu-Ri Kim, Seoul (KR); Hyun-Shik Hong, Seoul (KR); Sang-Hyeok Lee, Seoul (KR); Cho-Won Kim, Seoul (KR); Seong-Yeol Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 615 days.

(21) Appl. No.: 17/989,956

(22) Filed: Nov. 18, 2022

(65) Prior Publication Data

US 2023/0330261 A1     Oct. 19, 2023

(30) Foreign Application Priority Data

Apr. 13, 2022   (KR) .................. 10-2022-0046025
Aug. 5, 2022    (KR) .................. 10-2022-0097807

(51) Int. Cl.
| | |
|---|---|
| A61K 9/70 | (2006.01) |
| A61K 31/7076 | (2006.01) |
| A61K 33/34 | (2006.01) |
| A61K 45/06 | (2006.01) |
| A61K 47/52 | (2017.01) |
| A61K 47/69 | (2017.01) |

(52) U.S. Cl.
CPC .......... *A61K 47/6949* (2017.08); *A61K 47/52* (2017.08)

(58) Field of Classification Search
None
See application file for complete search history.

(56) References Cited

FOREIGN PATENT DOCUMENTS

| | | | | |
|---|---|---|---|---|
| KR | 10-2021-0124077 A | 10/2021 | | |
| WO | WO-2008111077 A2 | * | 9/2008 | ........... C07D 471/04 |

OTHER PUBLICATIONS

Li et al., Cu x O self-assembled mesoporous microspheres with effective surface oxygen vacancy and their room temperature NO2 gas sensing performance, Sci China Mater 2018, 61(8): 1085-1094 (Year: 2018).*
Alvarez et al., Coordinating Ability of Anions, Solvents, Amino Acids, and Gases towards Alkaline and Alkaline-Earth Elements, Transition Metals, and Lanthanides Chem. Eur. J. 2020, 26, 4350-4377 (Year: 2020).*
Alvarez Chem. Eur. J. 2020, 26, 4350-4377 (graphical abstract) (Year: 2020).*
Yu, C.H., Dolgova, N.V. and Dmitriev, O.Y. (2017), Dynamics of the metal binding domains and regulation of the human copper transporters ATP7B and ATP7A. IUBMB Life, 69: 226-235. (Year: 2017).*
Liang, Hao, et al. "Multicopper laccase mimicking nanozymes with nucleotides as ligands." *ACS applied materials & interfaces* 9.2 (Dec. 22, 2016): pp. 1352-1360.
Lopez, Anand, and Juewen Liu. "Light-activated metal-coordinated supramolecular complexes with charge-directed self-assembly." *The Journal of Physical Chemistry C* 117.7 (Jan. 28, 2013): pp. 3653-3661.
Huang, Xinhua, et al. "Self-assembly of morphology-tunable architectures from tetraarylmethane derivatives for targeted drug delivery." *Langmuir* 29.10 (Feb. 20, 2013): pp. 3223-3233.
Pérez-Yáñez, Sonia, et al. "Open-framework copper adeninate compounds with three-dimensional microchannels tailored by aliphatic monocarboxylic acids." *Inorganic Chemistry* 50.12 (May 20, 2011): pp. 5330-5332.

* cited by examiner

*Primary Examiner* — Kortney L. Klinkel
*Assistant Examiner* — Alison Azar Salamatian
(74) *Attorney, Agent, or Firm* — NSIP Law (57) ABSTRACT

Disclosed is a self-assembled complex containing copper ions, including: copper ions; and one or more ligands, in which the ligands and the copper ions are reversibly self-assembled or self-degraded, and when there are a plurality of types of ligands or a plurality of ligands, the shape of the self-assembled complex is formed differently depending on the blending ratio of the ligands.

15 Claims, 4 Drawing Sheets

SELF-ASSEMBLED COMPLEX CONTAINING COPPER IONS

CROSS-REFERENCE TO RELATED APPLICATIONS

This application claims priority to and the benefit of Korean Patent Application No. 10-2022-0046025 filed on Apr. 13, 2022 and Korean Patent Application No. 10-2022-0097807 filed on Aug. 5, 2022, in the Korean Intellectual Property Office, the entire contents of which are incorporated herein by reference.

TECHNICAL FIELD

The present invention relates to a self-assembled complex containing copper ions, and more particularly to a complex capable of carrying and delivering a substance.

BACKGROUND ART

Recently, the global covid-19 pandemic has raised interest in antiviral and antibacterial technologies, and antiviral and antibacterial technologies using copper have been developed. Copper affects the metabolism of cells or viruses, causing apoptosis and virus destruction.

Products and technologies which have antibacterial and antiviral effects by applying copper to places that people often come into contact with to release copper ions are the main products and technologies.

Since there is a limit to sustained release of copper ions, a technique for sustained release of copper ions is required.

Although a technique for an antibacterial film containing copper such as Korean Patent Application Laid-Open No. 10-2021-0124077 (publication date: Oct. 14, 2021) has been disclosed, such a technique cannot supply copper ions sustainably while maintaining a constant concentration.

SUMMARY OF THE INVENTION

The present disclosure has been made in an effort to provide a self-assembled complex containing copper ions, in which the self-degradation rate of the complex is adjusted by adjusting the constituent ingredients of the complex, and the active ingredient delivery rate is controlled by adjusting the self-degradation rate of the complex.

An embodiment of the present disclosure provides a self-assembled complex containing copper ions, including: copper ions; and one or more ligands, in which the ligands and the copper ions are reversibly self-assembled or self-degraded, and when there are a plurality of types of ligands or a plurality of ligands, the shape of the self-assembled complex is formed differently depending on the blending ratio of the ligands.

In an exemplary embodiment, the shape of the self-assembled complex may be sequentially modified into a needle shape, a sea urchin shape and a sphere shape depending on the blending ratio of the ligands.

In an exemplary embodiment, the needle shape has a major axis and a minor axis and includes a form in which the length of the major axis is extended 1.5-fold to 100-fold or more compared to the length of the minor axis, the sea urchin shape includes the form of a three-dimensional structure having a plurality of pores on at least one of the surface and the inside and is a needle-like type having one or more needles on the surface, and the sphere shape may include those having an average diameter of 0.1 μm to 10 μm.

In an exemplary embodiment, the ligand may include at least one of phosphate and phosphonate.

In an exemplary embodiment, the ligand may include at least one of AMP, ADP, ATP, TMP, TDP, TTP, CMP, CDP, CTP, GMP, GDP, GTP, UMP, UDP, UTP, DNA, RNA, 2-aminoethylphosphonic acid (AEP), threose nucleic acid (TNA), glycol nucleic acid (GNA), 1,5-anhydrohexitol nucleic acid (HNA), 1,5-anhydroatritol nucleic acid (ANA), 2'-deoxy-2'-fluoroarabino nucleic acid (FANA) and cyclohexenyl nucleic acid (CeNA).

In an exemplary embodiment, the ligand includes at least one of AMP and ATP, the self-assembled complex may include a needle shape having a major axis and a minor axis, and as the blending ratio of ATP is increased, the aspect ratio of the major axis and the minor axis of the needle shape may be decreased.

In an exemplary embodiment, the aspect ratio may include 5 to 50.

In an exemplary embodiment, the ligand is a mixture of AMP and ATP, the AMP and the ATP are included at a molar concentration ratio of 99.99:0.01 to 85:15, and the self-assembled complex may be formed in the form of a sea urchin.

In an exemplary embodiment, the ligand is a mixture of AMP and ATP, the AMP and the ATP are included at a molar concentration ratio of 85:15 to 50:50, and the self-assembled complex may be formed in the form of a sphere.

In an exemplary embodiment, a self-assembled complex may be formed by at least one of π-π interaction and hydrogen bond between the neighboring ligands; or at least one of coordination bond and hydrogen bond between the copper ion and the ligand.

In an exemplary embodiment, the copper ions and the ligand may be included at a molar concentration ratio of 5:1 to 1:1.

In an exemplary embodiment, the self-assembled complex may be self-degraded for 1 day to 30 days.

In an exemplary embodiment, the self-assembled complex may further contain an active ingredient, and the active ingredient may be carried in the self-assembled complex.

In an exemplary embodiment, the active ingredient may be at least one of adenosine, guanosine, uridine, cytidine, doxorubicin, a drug, a protein, an organic acid, an organic base, a fragrance and a dye.

In an exemplary embodiment, the active ingredient is excreted by self-degradation of the self-assembled complex, and the active ingredient may be sustainably released during a release time.

In an exemplary embodiment, the release time may be 1 day to 30 days. In an exemplary embodiment, the self-assembled complex is self-degraded to release at least one of the copper ions and the ligands during a release time, and the release time may be adjusted by at least one of the type and blending ratio of the ligand.

In an exemplary embodiment, the self-assembled complex may be used as a substance delivery carrier.

In an exemplary embodiment, the self-assembled complex may be provided in the form of one or more of a needle shape and a sea urchin shape depending on the blending ratio of the ligands, and the self-assembled complex may be used as at least one of an antibacterial agent, a bactericide, an antifungal agent, an antiviral agent and a needle for a microneedle patch.

According to embodiments of the present disclosure, it is possible to form a self-assembled complex containing copper ions and to provide a self-assembled complex for adjusting the self-degradation rate of the complex by adjusting the constituent ingredients of the complex and controlling the active ingredient delivery rate by adjusting the self-degradation rate of the complex.

DETAILED DESCRIPTION

Specific details of other exemplary embodiments are included in the detailed description and drawings.

The benefits and features of the present application, and the methods of achieving the benefits and features will become apparent with reference to embodiments to be described below in detail along with the accompanying drawings. However, the present invention is not limited to the embodiments disclosed below and may be implemented in various different forms, and unless otherwise specified in the following description, all numbers, values and/or expressions expressing ingredients, reaction conditions, and contents of ingredients in the present invention are to be understood as modified in all instances by the term "about" as such numbers are inherently approximations that are reflective of, among other things, the various uncertainties of measurement encountered in obtaining such values. In addition, when a numerical range is disclosed in the present description, the numerical range is continuous, and includes, unless otherwise indicated, every value up to a maximum value, which includes a minimum value to the maximum value of the numerical range. Furthermore, when the numerical range refers to integers, unless otherwise indicated, the integers include every integer up to a maximum value, which includes a minimum value to the maximum value.

Further, it will be appreciated that in the present invention, when a range is described for a variable, the variable includes all the values in the described range including the end points described in the range. It will be appreciated that for example, a range of "5 to 10" includes not only values of 5, 6, 7, 8, 9, and 10, but also any sub range of 6 to 10, 7 to 10, 6 to 9, 7 to 9, and the like, and also includes any value between appropriate integers within the described range, such as 5.5, 6.5, 7.5, 5.5 to 8.5, and 6.5 to 9. It will be appreciated that for example, a range of "10% to 30%" includes not only all the integers including values of 10%, 11%, 12%, 13%, and the like and up to 30%, but also any sub range of 10% to 15%, 12% to 18%, 20% to 30%, and the like, and also includes any value between appropriate integers within the described range, such as 10.5%, 15.5%, and 25.5%.

Figure 1:
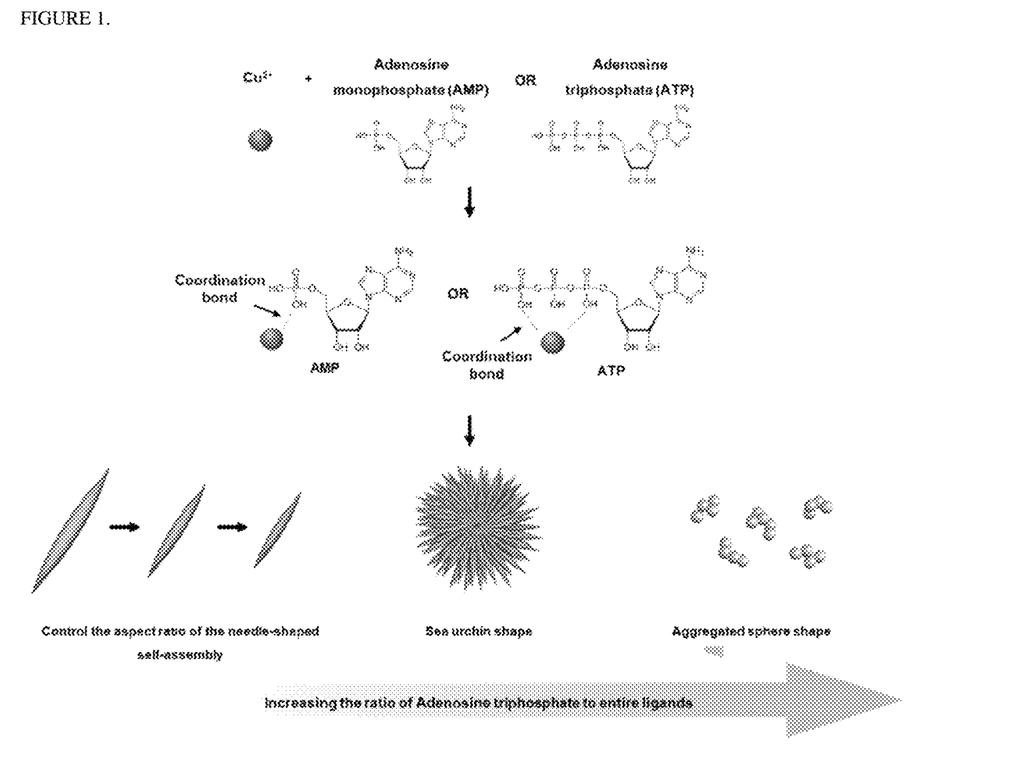
FIG. 1 is a view schematically showing that the copper ion and the ligand according to an exemplary embodiment of the present invention form a self-assembled complex.

FIG. 1 is a view schematically illustrating a process in which a self-assembled complex containing copper ions according to an exemplary embodiment of the present invention is self-assembled.

For example, the copper ion ($Cu^{2+}$) may be coordinated to a phosphoric acid group of AMP or ATP which is a ligand to form a metal complex. In addition, although not shown in the drawings, the base moiety of the ligand contains an aromatic ring, and thus, may form π-π interactions or form hydrogen bonds between the aromatic rings. Furthermore, although not shown in the drawings, water molecules may be bonded to the calcium ions, and the water molecules may form hydrogen bonds with the nitrogen of the base moiety.

The self-assembled complex may thus be formed by including coordination bonds, hydrogen bonds and π-π interactions between calcium ions and ligands, and the complex may be formed by at least one bond among them.

According to an aspect of the present invention, exemplary embodiments of the present invention may include a self-assembled complex containing copper ions, including: copper ions; and one or more ligands, in which the ligands and the copper ions are reversibly self-assembled or self-degraded, and when there are a plurality of types of ligands or a plurality of ligands, the shape of the self-assembled complex is formed differently depending on the blending ratio of the ligands.

The shape of the self-assembled complex may be sequentially modified into a needle shape, a sea urchin shape and a sphere shape depending on the blending ratio of the ligands. For example, the needle shape and the sea urchin shape may coexist, and the sea urchin shape and the sphere shape may coexist depending on the degree of blending ratio of the ligands.

The needle shape has a major axis and a minor axis and may include a form in which the length of the major axis is extended to 1.5-fold to 100-fold or more compared to the length of the minor axis. The sea urchin shape may include the form of a three-dimensional structure having a plurality of pores on at least one of the surface and the inside. Further, the sea urchin shape may be provided as a needle-like type having one or more needles on the surface. The sphere shape may include those having an average diameter of 0.1 μm to 10 μm.

When the self-assembled complex is in the form of a needle, the self-assembled complex has a major axis and a minor axis, and the aspect ratio of the major axis and the minor axis may be changed depending on the blending ratio of the ligands. Specifically, the needle shape has a major axis and a minor axis, and may be provided in a form, such as, for example, a microneedle.

When the self-assembled complex has a sea urchin shape, the self-assembled complex may be in the form of, for example, a spiky sphere. The sea urchin shape may be provided with the needle shape forming an assembly. The sea urchin shape is in a form in which a plurality of needle shapes is aggregated, and may be specifically provided in an approximately spherical form with a plurality of needle shapes arranged in a direction toward the center.

When the self-assembled complex has a spherical shape, the surface of the self-assembled complex may be relatively smoothly formed unlike the sea urchin shape. As the blending ratio of the ligands is varied, the sea urchin shaped self-assembled complex may be dissociated to form the sphere shape.

Depending on the blending ratio (the molar concentration ratio) of the ligands, the needle shape and the sea urchin shape may be present individually or simultaneously. Further, depending on the blending ratio (the molar concentration ratio) of the ligands, the sea urchin shape and the sphere shape may be present individually or simultaneously.

The self-assembled complex according to the present exemplary embodiment may be used in the form of a patch and the like when provided in the form of the needle. Specifically, the needle-shaped self-assembled composite may be fixed vertically to the form of a sheet such as a polymer or a non-woven fabric, and may be used as a microneedle patch.

When the self-assembled complex is provided in the form of a sea urchin, the self-assembled complex may be used for applications such as a microneedle, which is a three-dimensional form.

When the self-assembled complex is provided in the form of a needle or a sea urchin, the self-assembled complex is provided with rigidity so as to penetrate the epidermal layer of the skin, and thus may be used for a microneedle patch. When the self-assembled complex is used for a microneedle patch, the self-assembled complex may be applied to cosmetic devices, medical devices, and the like, and may improve the delivery efficiency of a drug.

The ligand may be a substance capable of self-assembly through coordination bonds with the copper ions. The ligand may be bonded to the copper ions to form a metal complex compound.

The ligand may include at least one of phosphate and phosphonate. The phosphate or phosphonate may be a moiety capable of being coordinated to the copper ions.

For example, the ligand may be at least one of adenosine monophosphate (AMP), adenosine diphosphate (ADP), adenosine triphosphate (ATP), thymidine monophosphate (TMP), thymidine diphosphate (TDP), thymidine triphosphate (TTP), cytidine monophosphate (CMP), cytidine diphosphate (CDP), cytidine triphosphate (CTP), guanosine monophosphate (GMP), guanosine diphosphate (GDP), guanosine triphosphate (GTP), uridine monophosphate (UMP), uridine diphosphate (UDP), uridine triphosphate (UTP), DNA, RNA, 2-aminoethylphosphonic acid (AEP), threose nucleic acid (TNA), glycol nucleic acid (GNA), 1,5-anhydrohexitol nucleic acid (HNA), 1,5-anhydroatritol nucleic acid (ANA), 2'-deoxy-2'-fluoroarabino nucleic acid (FANA) and cyclohexenyl nucleic acid (CeNA).

The copper ion may be coordinated to an electron-rich moiety, such as, for example, the phosphoric acid group moiety of the ligand, to form a metal complex compound.

For example, the ligand includes at least one of AMP and ATP, and the self-assembled complex may form a needle shape having a major axis and a minor axis. Here, the ligand may have only AMP, and may include both AMP and ATP. As the ATP blending ratio (the molar concentration ratio) is increase, the aspect ratio of the major axis and minor axis of the needle shape may be decreased. Here, the AMP and ATP may be mixed at a blending ratio (the molar concentration ratio) of 100:0 to 99:1.

The aspect ratio may include 5 to 50.

For example, the ligand is a mixture of AMP and ATP, and the AMP and ATP are included at a blending ratio (the molar concentration ratio) of 99.99:0.01 to 85:15, and the self-assembled complex may be formed in the form of a sea urchin. The ligand preferably includes the AMP and ATP at a blending ratio (the molar concentration ratio) of 99:1 to 90:10, and the self-assembled complex may be formed of a fibrous material.

For example, the ligand is a mixture of AMP and ATP, and the AMP and ATP are included at a blending ratio (the molar concentration ratio) of 85:15 to 50:50, and the self-assembled complex may be formed in the form of a sphere. The ligand is a mixture of AMP and ATP, and the AMP and ATP are included at a blending ratio (the molar concentration ratio) of 75:25 to 50:50, and the self-assembled complex may be formed in the form of a sphere.

The blending ratio of the ligands may be based on the molar concentration.

A self-assembled complex may be formed by at least one of π-π interaction and hydrogen bond between the neighboring ligands; or at least one of coordination bond and hydrogen bond between the copper ion and the ligand.

The self-assembled complex may be formed by at least one of coordination bond, π-π interaction and hydrogen bond between the neighboring copper ion and ligand. The self-assembled complex enables copper ions and ligands to be densely adhered to each other through these interactions or bonds. Therefore, the self-assembled complex may be formed by densely aggregating copper ions and ligands.

The self-assembled complex may be formed more densely or loosely depending on the type or blending ratio of the ligands.

For example, as the blending ratio of ATP in the ligand is increased, the negative charge in the self-assembled complex is increased, and the self-assembled complex may be more densely formed and may be more aggregated.

The copper ions and the ligand may be included at a blending ratio (the molar concentration ratio) of 5:1 to 1:1.

The self-assembled complex may be spontaneously self-assembled and self-degraded. However, self-degradation may be promoted under conditions including a buffer solution. The buffer solution may create an environment similar to an in vivo environment. The buffer solution may promote the degradation of the self-assembled complex by exchanging ions with the constituent ingredients of the self-assembled complex.

In the presence of the buffer solution, the self-assembled complex may be self-degraded for 1 day to 30 days. Preferably, the self-assembled complex may be self-degraded for 1 day to 15 days.

The self-assembled complex further contains an active ingredient, and the active ingredient may be carried in the self-assembled complex. The active ingredient may be assembled together and carried in the self-assembled composite when the self-assembled composite is self-assembled.

The active ingredient may be released when the self-assembled complex is self-degraded. Therefore, the release time and rate of the active ingredient may be adjusted by adjusting the self-degradation time of the self-assembled complex. The self-assembled complex may have different self-degradation rates depending on the type or blending ratio of the ligands, and the self-assembled complex may be sequentially self-degraded from the surface at a predetermined rate. Therefore, the active ingredient may be sustainably released at a predetermined rate during the self-degradation time of the self-assembled complex. That is, the active ingredient may be sustainably released at a predetermined rate during the release time.

The active ingredient may be at least one of, for example, adenosine, guanosine, uridine, cytidine, doxorubicin, a drug, a protein, an organic acid, an organic base, a fragrance and a dye, but is not limited thereto.

In addition, when the self-assembled complex is self-degraded, at least one of the copper ions and the ligands in addition to the active ingredient may be released during the release time. Furthermore, the release time may be adjusted by the blending ratio of the ligands. Therefore, the self-assembled complex may be used to deliver the copper ions or ligands in vivo.

For example, the release time may be 1 day to 30 days, preferably 1 day to 15 days.

The self-assembled complex may be used as a substance delivery carrier. The self-assembled complex may be used as at least one of an antibacterial agent, a bactericide, an antifungal agent, an antiviral agent and a needle for a microneedle patch.

Hereinafter, Examples and Comparative Examples of the present invention will be described. However, the following Examples are only a preferred Example of the present invention, and the scope of the present invention is not limited by the following Examples.

Preparation Examples

1. Production of Self-Assembled Complex

A solution was each prepared by dissolving copper chloride, adenosine monophosphate (AMP), and adenosine triphosphate (ATP) in ultrapure water so as to have a final concentration of 1 M. The stock solution was put into a conical tube, and ultrapure water was added thereto by calculating the amount of ultrapure water. An aqueous adenosine phosphate solution and an aqueous calcium ion solution are added thereto in this order, and the resulting mixture is mixed well by vortexing, and reacted for 24 hours.

2. Carrying Active Ingredient in Self-Assembled Complex

When synthesis is performed by containing a drug such as adenosine in the self-assembled complex, adenosine is added before calcium ions are added and the rest of the procedure is performed. Thereafter, the experiment was carried out in the same procedure as 1, and when the 24-hour reaction is completed, unreacted substances are removed, and in order to obtain a self-assembled complex, centrifugation is performed at 10,000 RPM for 10 minutes through a centrifuge to settle down a self-assembly and remove the supernatant. The same volume of ultrapure water is added as previously and centrifugation is performed again. This procedure is repeated twice.

3. Substances Used in Experiment

Copper(II) chloride (CAS: 10125-13-0, Sigma-Aldrich)
Adenosine-5'-monophosphate disodium salt (CAS: 4578-31-8, Alfa Aesar)
Adenosine 5'-triphosphate disodium salt (51963-61-2, Daejung Reagent Chemicals & Metals Co., Ltd)
Adenosine (CAS: 58-61-7, Sigma-Aldrich)
PBS solution (1× pH 7.4, ML 008-01, WELGENE)
Copper Assay Kit (MAK127, Sigma-Aldrich)

Examples

1. Example 1

A mixed solution was prepared by changing the concentration of AMP and ATP in 1 ml of ultrapure water. Thereafter, the solution was allowed to react at room temperature for 24 hours to form a self-assembled complex.

TABLE 1

|  | AMP concentration | ATP concentration | Copper chloride concentration |
|---|---|---|---|
| Example 1-1 | 20 mM | 0 mM | 20 mM |
| Example 1-2 | 19.98 mM | 0.02 mM | 20 mM |
| Example 1-3 | 19.8 mM | 0.2 mM | 20 mM |

2. Example 2

A mixed solution was prepared by changing the concentration of AMP and ATP in 5 ml of ultrapure water. Thereafter, the solution was allowed to react at room temperature for 24 hours to form a self-assembled complex.

TABLE 2

|  | AMP concentration | ATP concentration | Copper chloride concentration |
|---|---|---|---|
| Example 2-1 | 20 mM | 0 mM | 20 mM |
| Example 2-2 | 18 mM | 2 mM | 20 mM |
| Example 2-3 | 15.5 mM | 5 mM | 20 mM |
| Example 2-4 | 10 mM | 10 mM | 20 mM |

Experimental Examples

1. Morphological Analysis

Figure 2:
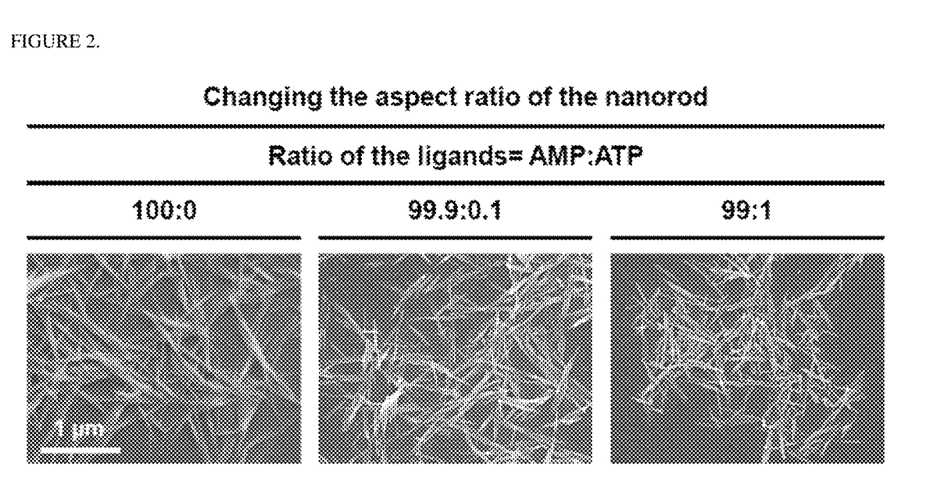
FIGS. 2 to 4 illustrate SEM images and aspect ratios of self-assembled complexes prepared by varying the blending ratio (the molar concentration ratio) of AMP and ATP according to an exemplary embodiment of the present invention.
Figure 3:
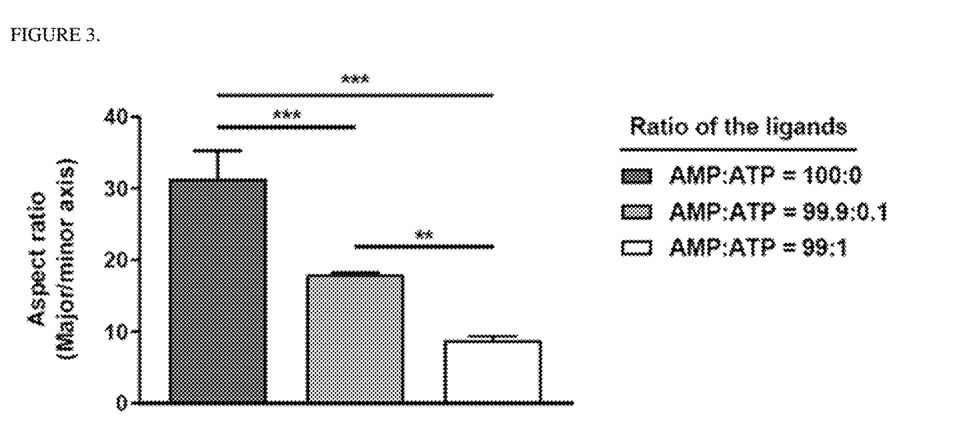
Figure 4:
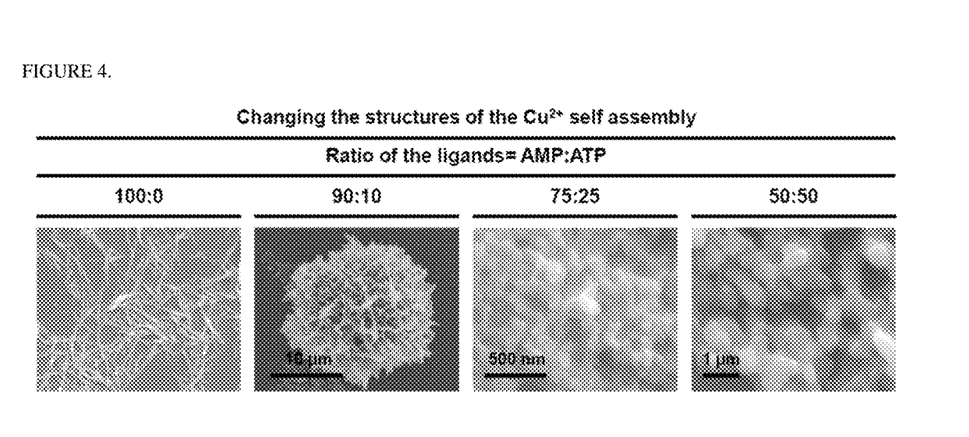

FIGS. 2 and 4 are views illustrating scanning electron microscopy (SEM) images and aspect ratios of needle shapes for the Examples.

As illustrated in FIG. 2, it can be confirmed that all the self-assembled complexes were formed in the form of a needle, and the sizes of the self-assembled complexes decreased and the aspect ratios decreased as the blending ratio of ATP increased. FIG. 3 graphically illustrates the aspect ratio with increasing ATP blending ratio, where it can be clearly seen that the aspect ratio is decreased.

FIG. 4 includes the shapes of sea urchins and spheres formed by further increasing the blending ratio (the molar concentration ratio) of ATP. When AMP and ATP were included at a blending ratio of 90:10, it could be confirmed that a spherical morphology (sea urchin shape) with a pointed surface was formed, which is clearly distinguished from the needle shape. In the sea urchin shape, it can be confirmed that there are many pores inside even in the image.

Further, when AMP and ATP are included at a blending ratio (the molar concentration ratio) of 75:25 in FIG. 4, it can be confirmed that the self-assembled complex was formed in a substantially spherical shape. The spherical shape is a spherical shape with a smooth surface, and these spherical shapes may be individually present or may be aggregated to form a structure. This shape is clearly distinguished from that of a sea urchin. In addition, unlike the needle shape and the sea urchin shape, the shape was not changed more clearly even when the ATP blending ratio was increased.

In the following Table 3, the difference in the aspect ratio of the needle shape is observed depending on the blending ratio (the molar concentration ratio) of AMP and ATP.

TABLE 3

| AMP 99% | | | AMP 99.9% | | | AMP 100% | | |
| --- | --- | --- | --- | --- | --- | --- | --- | --- |
| Minor axis (μm) | Major axis (μm) | Ratio | Minor axis (μm) | Major axis (μm) | Ratio | Minor axis (μm) | Major axis (μm) | Ratio |
| 0.063 | 0.546 | 8.666667 | 0.094 | 1.684 | 17.91489 | 0.142 | 5.083 | 35.795775 |
| 0.067 | 0.544 | 8.119403 | 0.102 | 1.826 | 17.90196 | 0.211 | 4.287 | 20.317536 |
| 0.067 | 0.566 | 8.447761 | 0.1 | 1.829 | 18.29 | 0.177 | 5.252 | 29.672316 |

According to Table 3, it can be confirmed that the aspect ratio of the minor axis and the major axis is clearly decreased as the ATP blending ratio is increased.

2. Drug Delivery

Figure 5:
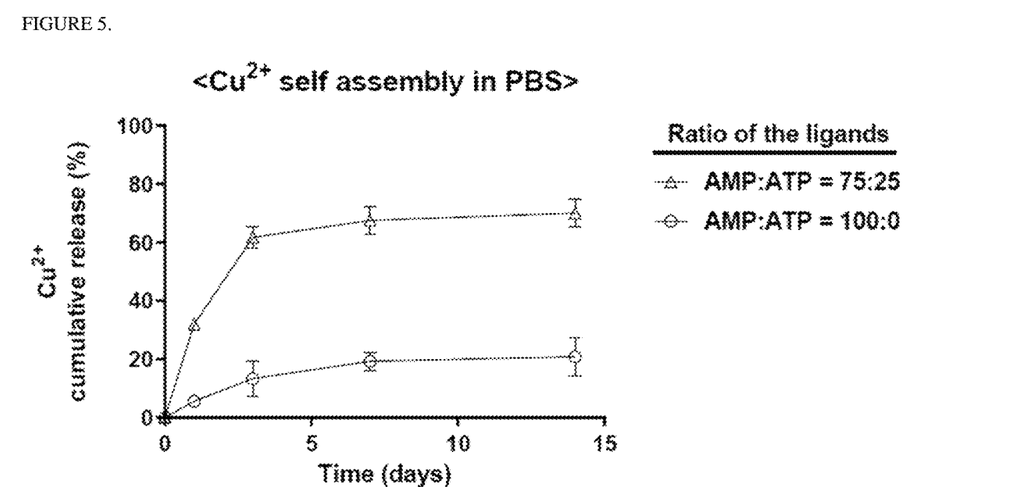
FIGS. 5 to 7 are drug release test results of self-assembled complexes prepared by varying the blending ratio of AMP and ATP according to an exemplary embodiment of the present invention.
Figure 6:
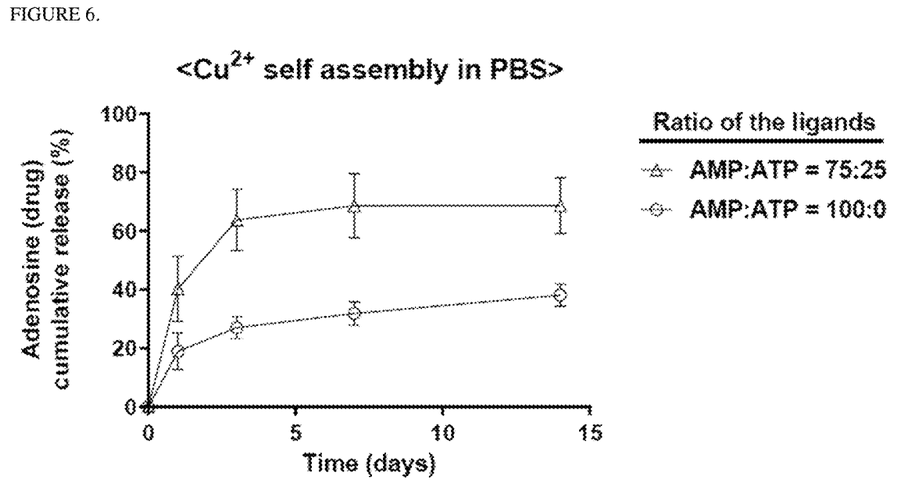
Figure 7:
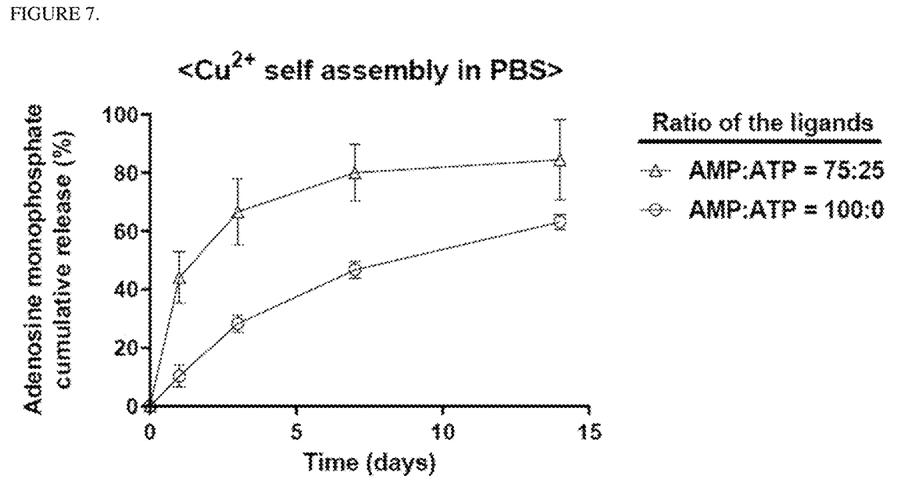

FIGS. 5 to 7 are experimental results of performing an experiment in which self-assembled complexes deliver and release drugs.

Self-assembled complexes produced by varying the blending ratio of AMP and ATP were put into a PBS solution, and the time required for the self-assembled complexes to be self-degraded and release a substance was observed. Adenosine was used as a drug carried in the self-assembled complex.

The self-assembled complexes were put into a PBS solution, and all the PBS buffer solution was collected at regular intervals, and the same amount of PBS buffer solution was added thereto. This buffer solution is for setting up an environment similar to the biological environment in drug delivery.

After self-degradation was performed, the elution amounts of AMP and adenosine eluted were confirmed through high performance liquid chromatography (HPLC), and copper was confirmed using a copper assay kit.

From the drawings, it can be seen that the cumulative release amounts of AMP, copper ions and adenosine were sustainably increased at a constant rate for about 15 days after the self-assembled complex was self-degraded.

From these results, it can be confirmed that the self-assembled complex has the property of being continuously self-degraded at a certain level.

Further, when the difference depending on the blending ratio of the ligands is examined, it can be confirmed that when AMP and ATP are used, the initial release rate is fast, and thereafter, the drug is released at a slow rate. In addition, it can be confirmed that when only AMP is included, the rate of release is relatively slow, but a certain amount of AMP is sustainably released. Therefore, the rate and duration of drug delivery may be adjusted by adjusting the blending ratio of the ligands.

Furthermore, this experimental result indicates that experiments are conducted in a buffer solution similar to the in vivo environment, and the self-assembled complex can also deliver drugs in vivo in the same manner It will be understood by those skilled in the art to which the present invention pertains that the present invention can be implemented in other concrete forms without modifying the technical spirit or essential features of the present invention. Therefore, it should be understood that the above-described examples are only illustrative in all aspects and not restrictive. The scope of the present invention is represented by the claims to be described below rather than the detailed description, and it should be interpreted that the meaning and scope of the claims and all the changes or modified forms derived from the equivalent concepts thereto fall within the scope of the present invention.

What is claimed is:

1. A self-assembled complex containing copper ions, comprising:
   copper ions; and
   a plurality of ligands,
   wherein the plurality of ligands and the copper ions are reversibly self-assembled or self-degraded,
   wherein a shape of the self-assembled complex is formed differently depending on a blending ratio of the plurality of ligands,
   wherein the plurality of ligands comprise at least one AMP and ATP,
   wherein the self-assembled complex comprises a needle shape having a major axis and a minor axis, and
   wherein, as the blending ratio of ATP is increased, an aspect ratio of the major axis and the minor axis of the needle shape is decreased.

2. The self-assembled complex containing copper ions of claim 1, wherein the needle shape has a major axis and a minor axis and comprises a form in which a length of the major axis is extended 1.5-fold to 100-fold or more compared to a length of the minor axis.

3. The self-assembled complex containing copper ions of claim 1, wherein the plurality of ligands comprise at least one of phosphate and phosphonate.

4. The self-assembled complex containing copper ions of claim 1, wherein the plurality of ligands further comprise at least one of ADP, TMP, TDP, TTP, CMP, CDP, CTP, GMP, GDP, GTP, UMP, UDP, UTP, DNA, RNA, 2-aminoethylphosphonic acid (AEP), threose nucleic acid (TNA), glycol nucleic acid (GNA), 1,5-anhydrohexitol nucleic acid (HNA), 1,5-anhydroatritol nucleic acid (ANA), 2'-deoxy-2'-fluoroarabino nucleic acid (FANA) and cyclohexenyl nucleic acid (CeNA).

5. The self-assembled complex containing copper ions of claim 1, wherein the aspect ratio is 5 to 50.

6. The self-assembled complex containing copper ions of claim 1, wherein the self-assembled complex is formed by at least one of IT-TT interaction and hydrogen bond between neighboring ligands of the plurality of ligands; or at least one of coordination bond and hydrogen bond between the copper ion and the plurality of ligands.

7. The self-assembled complex containing copper ions of claim 1, wherein the copper ions and the plurality of ligands are comprised at a blending ratio of 5:1 to 1:1.

8. The self-assembled complex containing copper ions of claim 1, wherein the self-assembled complex is self-degraded in 1 day to 30 days.

9. The self-assembled complex containing copper ions of claim 1, further comprising an active ingredient,
   wherein the active ingredient is carried in the self-assembled complex.

10. The self-assembled complex containing copper ions of claim 9, wherein the active ingredient is at least one of adenosine, guanosine, uridine, cytidine, doxorubicin, a drug, a protein, an organic acid, an organic base, a fragrance and a dye.

11. The self-assembled complex containing copper ions of claim 9, wherein the active ingredient is excreted by self-degradation of the self-assembled complex, and
the active ingredient is sustainably released during a release time.

12. The self-assembled complex containing copper ions of claim 11, wherein the release time is 1 day to 30 days.

13. The self-assembled complex containing copper ions of claim 1, wherein the self-assembled complex is self-degraded to release at least one of the copper ions and the plurality of ligands during a release time,
wherein the release time is adjusted by at least one of a type and a blending ratio of the plurality of ligands,
wherein the plurality of ligands further comprise at least one of ADP, TMP, TDP, TTP CMP, CDP, CTP, GMP, GDP, GTP, UMP, UDP, UTP, DNA, RNA, 2-aminoethylphosphonic acid (AEP), threose nucleic acid (TNA), glycol nucleic acid (GNA), 1,5-anhydrohexitol nucleic acid (HNA), 1,5-anhydroatritol nucleic acid (ANA), 2'-deoxy-2'-fluoroarabino nucleic acid (FANA) and cyclohexenyl nucleic acid (CeNA), and
wherein the type of the plurality of ligands is selected from the group consisting of AMP, ADP, ATP, TMP, TDP, TTP, CMP, CDP, CTP, GMP, GDP, GTP, UMP, UDP, UTP, DNA, RNA, 2-aminoethylphosphonic acid (AEP), threose nucleic acid (TNA), glycol nucleic acid (GNA), 1,5-anhydrohexitol nucleic acid (HNA), 1,5-anhydroatritol nucleic acid (ANA), 2'-deoxy-2'-fluoroarabino nucleic acid (FANA) and cyclohexenyl nucleic acid (CeNA).

14. A self-assembled complex containing copper ions, comprising:
copper ions; and
a plurality of ligands,
wherein the plurality of ligands and the copper ions are reversibly self-assembled or self-degraded,
wherein a shape of the self-assembled complex is formed differently depending on a blending ratio of the plurality of ligands,
wherein the plurality of ligands are a mixture of AMP and ATP,
wherein the AMP and the ATP are comprised at the blending ratio of 99.99:0.01 to 85:15, and
wherein the self-assembled complex is the sea urchin shape.

15. A self-assembled complex containing copper ions, comprising:
copper ions; and
a plurality of ligands,
wherein the plurality of ligands and the copper ions are reversibly self-assembled or self-degraded,
wherein a shape of the self-assembled complex is formed differently depending on a blending ratio of the plurality of ligands,
wherein the plurality of ligands are a mixture of AMP and ATP,
wherein the AMP and the ATP are comprised at the blending ratio of 85:15 to 50:50, and
wherein the self-assembled complex is the sphere shape.

* * * * *